UNITED STATES PATENT OFFICE.

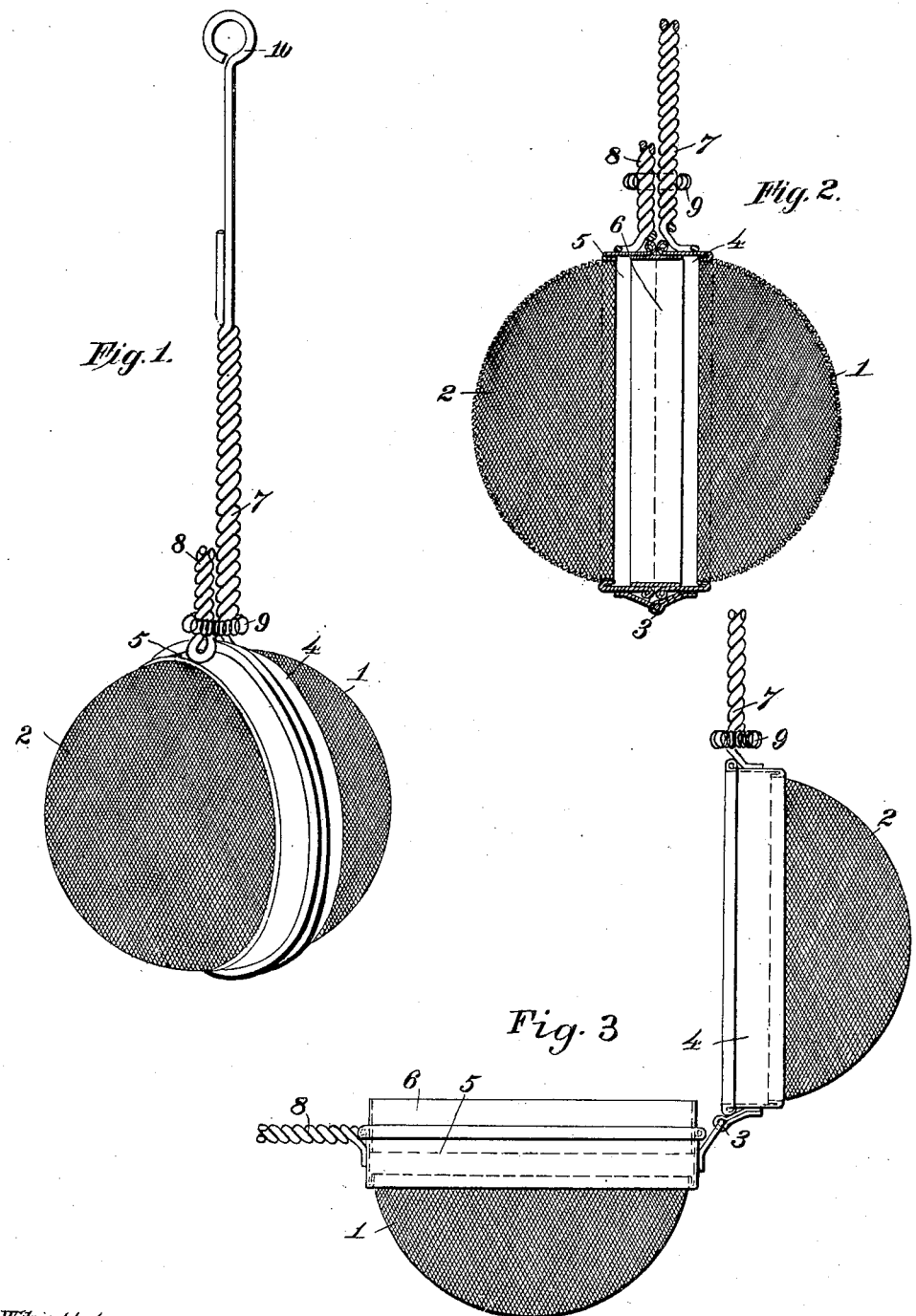

RICHARD TROEMEL, OF CHICAGO, ILLINOIS.

COFFEE AND TEA INFUSER.

No. 903,634.　　　　Specification of Letters Patent.　　　Patented Nov. 10, 1908.

Application filed October 25, 1907. Serial No. 399,090.

*To all whom it may concern:*

Be it known that I, RICHARD TROEMEL, a citizen of the United States, residing at Chicago, county of Cook, and State of Illinois, have invented certain new and useful Improvements in Coffee and Tea Infusers, of which the following is a specification.

My invention relates to coffee infusers and the objects of my invention are to provide an infuser of improved construction which will prevent the grounds from mixing with the infusion and to provide means for securely locking the device in closed position.

My invention will be more readily understood by reference to the accompanying drawings forming a part of this specification and in which—

Figure 1 is a perspective view of an infuser embodying my invention in its preferred form, Fig. 2 is a sectional view thereof, and Fig. 3 is a side elevation in opened position.

Referring to the drawings, 1 and 2 indicate the semispherical halves of the infuser hingedly connected as at 3. The portions, 1 and 2, are formed of fine wire mesh and are provided with the annular rims 4 and 5 to which the hinge members are connected. The rim, 5, is provided with an annular flange, 6, which securely closes the joint between the rim when the device is in closed position. Diametrically opposite from the hinge, 3 is a stem, 7, secured to and extending radially from the rim, 4. This is formed of stout wire doubled and twisted through a portion of its length for a purpose hereinafter described. Similarly arranged upon the rim, 5, is a short stem, 8, which is also doubled and twisted as shown. When the infuser is closed, the stems, 7 and 8 lie adjacent to each other and parallel, and the device is locked in closed position by a ring, 9, arranged upon the stem, 7 and adapted to pass over the stem, 8. (See Fig. 1.) I prefer to form the ring, 9 of a spiral spring bent into annular form as shown and normally of less diameter than the combined diameters of the stems, 7 and 8. It is obvious that when the ring, 9, is pressed down over the stem, 8, it will bind the parts tightly together, and the convolutions of the resilient twisted stems will prevent accidental displacement thereof. The stem, 7 is quite long and is provided with an eye, 10 by means of which it may be suspended within the coffee pot. It is obvious that the device may be used as a tea infuser as well as for coffee.

Having described my invention what I claim as new and desire to secure by Letters Patent is:

1. In a device of the class described, a pair of hemi-spherical members hingedly connected, a long stem extending from one of said members and a short stem extending from the other member, and a locking ring adapted to engage said stems to hold the device in closed position, each of said stems being formed of a twisted resilient member to prevent accidental displacement of said ring, substantially as described.

2. As an article of manufacture an infuser comprising a pair of hemispherical members each having an annular rim and hingedly connected, in combination with a stem extending radially from one of said members and comprising a piece of wire bent back upon itself and twisted throughout a portion of its length and a short stem extending from the other member and comprising a piece of wire doubled and twisted, and a locking ring adapted to engage said stems and formed of a coiled spring, substantially as described.

In testimony whereof I have signed my name to this specification in the presence of two subscribing witnesses.

RICHARD TROEMEL.

Witnesses:
　FRANCES E. SHEEHY,
　HELEN F. LILLIS.